United States Patent

Lu et al.

[11] Patent Number: 5,805,217
[45] Date of Patent: Sep. 8, 1998

[54] METHOD AND SYSTEM FOR INTERPOLATING MISSING PICTURE ELEMENTS IN A SINGLE COLOR COMPONENT ARRAY OBTAINED FROM A SINGLE COLOR SENSOR

[75] Inventors: Ning Lu, Norcross; Zhiwu Lu, Atlanta, both of Ga.

[73] Assignee: Iterated Systems, Inc., Atlanta, Ga.

[21] Appl. No.: 663,615

[22] Filed: Jun. 14, 1996

[51] Int. Cl.$^6$ ............................... H04N 3/14; H04N 9/07
[52] U.S. Cl. ........................................... 348/273; 348/266
[58] Field of Search ..................................... 348/222, 239, 348/240, 246, 273, 272, 266; 382/162

[56] References Cited

U.S. PATENT DOCUMENTS

| | | | |
|---|---|---|---|
| 4,345,011 | 8/1982 | Drexhage | 430/7 |
| 4,663,661 | 5/1987 | Weldy et al. | 358/44 |
| 5,148,497 | 9/1992 | Pentland et al. | 382/54 |
| 5,373,322 | 12/1994 | Laroche et al. | 348/273 |
| 5,382,976 | 1/1995 | Hibbard | 348/273 |
| 5,398,066 | 3/1995 | Martinez-Uriegas et al. | 348/393 |

*Primary Examiner*—Wendy Garber
*Assistant Examiner*—Jacqueline Wilson
*Attorney, Agent, or Firm*—Morris, Manning & Martin L.L.P.

[57] ABSTRACT

A system and method for interpolating intensity values for a color component array are disclosed. Intensity values stored in a color component array are derived from intensity data sensed by a charge-coupled-device in a camera. First and second gradients are determined for the array elements which have no color intensity value corresponding to the color component stored in a first color component array. The gradients are used to select intensity values from the first color component array and a second color component array. The second color component array includes the intensity values for the color component which was sensed by the array element having no intensity value in the first color component array. Incorporation of intensity values of both the first and second color components reduces the likelihood of color artifacts. The method also includes determination of third and fourth gradients from the second color component array which are used to select the intensity values for the array element interpolation. An inventive system which implements the method of the present invention and an inventive arrangement of the filter elements in the color filter array is also disclosed.

13 Claims, 3 Drawing Sheets

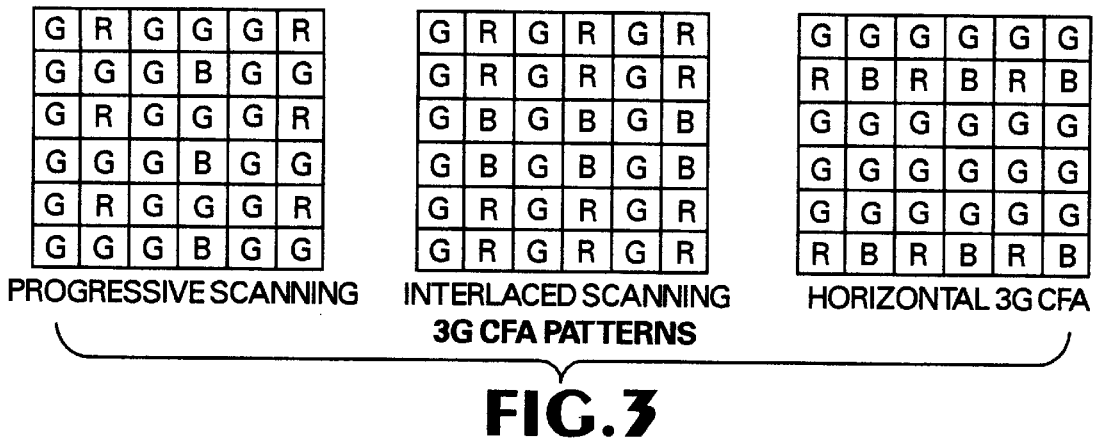

METHOD AND SYSTEM FOR INTERPOLATING MISSING PICTURE ELEMENTS IN A SINGLE COLOR COMPONENT ARRAY OBTAINED FROM A SINGLE COLOR SENSOR

DESCRIPTION OF THE INVENTION

This invention relates to interpolation of intensity values for picture elements of an image and, more particularly, to interpolating intensity values for array elements in a single color component array.

BACKGROUND OF THE INVENTION

Image capture devices, such as cameras, which use single-chip charge-coupled-devices ("CCD") are well known. These devices include an aperture through which light from the image being captured is transmitted and sensed by a CCD. The CCD is comprised of a plurality of sensor elements. Each sensor element senses the intensity of the light which impinges upon the sensor element. The intensity sensed by each sensor element within the CCD is transferred and stored in a memory or the like for image development. The intensities that are sensed by the sensor elements of the CCD correspond to gray scale values for a black and white image.

To obtain color images from a camera using a single CCD, a color filter array ("CFA") is interposed between the aperture of the camera and the CCD. The color filter array is comprised of a plurality of filter elements in a one to one correspondence with the sensor elements of a CCD. Each filter element allows only one type of colored light to pass through the element. This colored light then strikes a sensor element of the CCD which senses the intensity of the colored light on the sensor element. As a result, the data derived from a sensor element of the CCD has an intensity value and a color identifier since each sensor element corresponds to a color filter element.

Filter elements for a typical CFA normally allow three colors through. The most common colors for a CFA are red-green-blue ("RGB") or luminance-yellow-cyan ("L-Y-C"). By segregating intensity values for the same color into corresponding locations of an array of the same size as the CCD, three incomplete color component arrays are generated for an image. To generate a complete color image, however, a complete color array is required for each color component since the red, green and blue array elements are used to generate a single pixel of a color image. In order to generate intensity values for the undefined color component array elements, interpolation techniques have been developed.

The most common interpolation technique is bilinear interpolation. This interpolation is an average of the four intensity values actually sensed by the CCD which are closest to the undefined array element. This method assumes that the intensity values of the same color in the vicinity of the undefined array element are related to the undefined value. This technique may result in a poor approximation for the array element, especially on textured surfaces and at edges. This problem in interpolating intensities for array elements at these locations arises from the disparity in intensities for neighboring array elements at edges or other uneven surfaces. In effect, the interpolated intensity value becomes a bridge between different structures rather than being absorbed in one structure or the other. The resulting inaccuracy in intensity values may generate an artifact in the image.

An improvement over the bilinear method is disclosed in U.S. Pat. No. 5,382,976 to Hibbard. That patent is directed to the interpolation of array elements for a high frequency color component array. As is well known, the green color components of an RGB color component system, which is sometimes referred to as the luminance components, are thought to be the color component to which the human eye is most sensitive. This sensitivity means that the human eye discerns most of the detail in an image from the green color component or luminance of an image. So that a CCD captures detail to which the human eye responds, most CFAs include at least twice as many green or luminance color filter elements as other color filter elements.

The interpolation technique of U.S. Pat. No. 5,382,976 relies on the dominance of the green component to interpolate the green intensity values for the array elements in the green component array which did not receive a green intensity value that was actually sensed. The technique of this patent classifies the green component array elements having intensity values actually sensed for the green component proximate to the array element for which an intensity value is to be interpolated into a horizontal and a vertical class. The horizontal class is comprised of the intensity values for the array elements which are located on the same row as the array element for which a value is to be interpolated. The vertical class includes the intensity values for the green component which lie in the same column as the array element for which a value is to be interpolated. A gradient is determined for each class and the gradient corresponds to the absolute difference between the intensity values of the array elements in the same class. These gradients are then compared to a threshold. If the gradients for both classes are less than the threshold or if the gradients are both greater than the threshold, then the bilinear interpolation value is computed and used for the array element. If the gradient for only one class is below the threshold value, then only the intensities for the class corresponding to the gradient which is less than the threshold are used to interpolate the array element value. To interpolate array element intensity values for the color components other than green, called chromas in the patent, the interpolated green intensity values are subtracted from the corresponding intensities in a chroma color array. The array elements for which there are no intensity values in the chroma color array are then interpolated using the bilinear method. The resulting intensities for the chroma color component are called color differences in the patent and these are summed with the corresponding intensity values in the green or luminance color component array to obtain intensity values for the chroma color component arrays.

While the technique disclosed in U.S. Pat. No. 5,382,976 improves the image quality over those derived using the bilinear interpolation method alone, artifacts still result in images generated from this method. In particular, color artifacts arise when a gradient comparison results in an interpolated value for a green array element which is lower than it should be to accurately represent the image and the corresponding red or blue component improperly dominates the composite color image. This may be particularly noticeable at edges where an array element should be included in a horizontal or vertical edge but the bilinear interpolations for the elements of the chroma color component array includes intensities in both the horizontal and vertical classes.

Another interpolation technique is disclosed in U.S. Pat. No. 4,642,678 to Cok. That patent discloses a method of interpolation in which a median rather than an average value is used unless the array element for which an intensity value is to be interpolated conforms to a particular pattern. The median value for an array element is obtained by examining the four intensity values for the green or luminance color component proximate to the undefined array element which were actually sensed by the CCD elements. The largest and smallest intensity values are eliminated from the interpolation calculation and the remaining two intensity values are averaged to generate the interpolated value. The two patterns which are otherwise processed are known as stripe and corner patterns. When an intensity value for an array element corresponding to one of these two patterns is interpolated, the interpolation includes a calculation where the median value is adjusted according to an intensity value average corresponding to intensity values for array elements which are more remote than the four closest ones. While this method includes interpolation of intensity values for array elements at corners or within stripe patterns, the resulting images are still subject to color artifacts.

What is needed is an interpolation method which reduces the occurrence of color artifacts.

What is needed is a method of interpolation which more accurately interpolates values for the chroma color components.

SUMMARY OF THE INVENTION

The above limitations of prior interpolation methods are overcome by a method and system of the present invention. The method of the present invention includes the steps of using first color component intensities to determine a first and a second gradient for an array element which sensed a second color component intensity, comparing the first and second gradients to a predetermined threshold, selecting an interpolation direction in correspondence to the comparison between the first and second gradients and the predetermined threshold, and interpolating a first color component intensity value for the array element using first color component intensity values for one of the gradients and second color component intensity values which correspond to the selected interpolation direction. By using the color component intensity values for two color components in the vicinity of the array element for which an intensity value is being interpolated, more accurate interpolated intensity values for the color component are generated. The inclusion of the other color component intensity values in the interpolation process is thought to reduce the likelihood of color generated artifacts.

The method of the present invention may also include using second color component intensity values to determine a third and fourth gradient for the array element for which a first color component intensity is to be interpolated and selecting the interpolation direction in accordance with the third and fourth gradients whenever the first and second gradients are less than the predetermined threshold. By using gradients derived from color component intensities which are not the same color as the color intensity to be interpolated, determination of the direction for selecting the color component intensities to be included in the interpolation is further improved.

The method of the present invention may be used for a high frequency color component such as a green or luminance color component array of a color image. Likewise, the same approach may be used on one of the chroma color component arrays as well. Use of the method of the present invention more effectively interpolates intensity values for array elements because it incorporates the intensity values of two different color components in the vicinity of the array element for which a value is being interpolated.

A system which performs in accordance with the method of the present invention includes memory for the storage of the incomplete color component arrays and an interpolation processor performing under the control of a computer program. The interpolation processor identifies each array element of the array for which there is no intensity value and performs the above-described method for interpolating the intensity value for the identified array element.

BRIEF DESCRIPTION OF THE DRAWINGS

FIG. 3 is a depiction of illustrative 3G rectangular arrangements of filter elements in the color filter array of FIG. 1;

FIG. 4 is a depiction of triangular arrangements of filter elements in the color filter array of FIG. 1;

FIG. 6 is an exemplary illustration of array elements in a chroma array and a high frequency color array used to interpolate an intensity value for an undefined element in a chroma array.

DETAILED DESCRIPTION OF THE INVENTION

Figure 1:
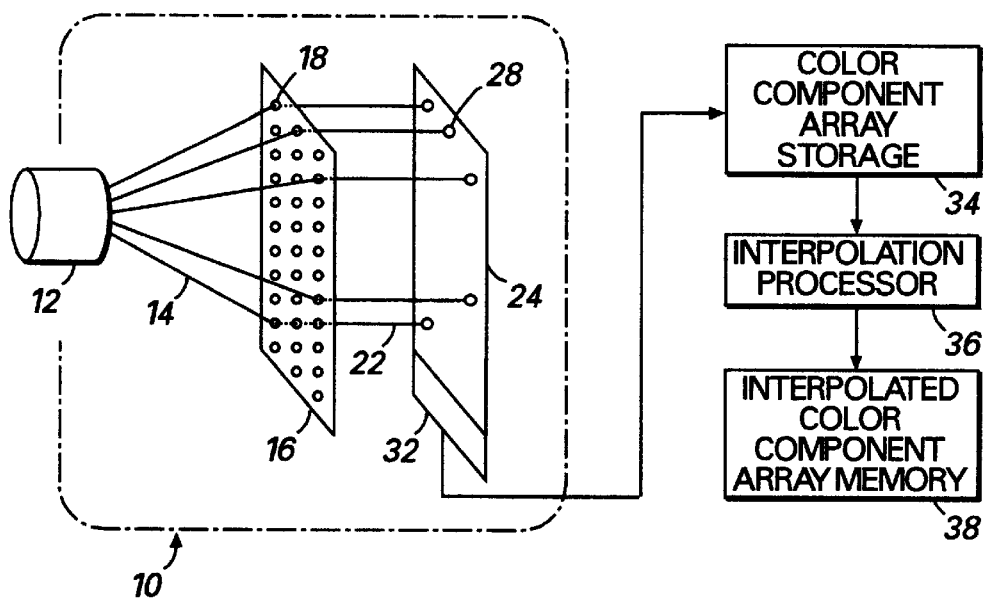
FIG. 1 is a schematic of a camera incorporating the system and method of the present invention.

A simplified camera construction utilizing the system and method of the present invention is shown in FIG. 1. The camera 10 includes an aperture 12 through which light from an image passes. Light rays 14 impinge upon the color filter array (CFA) 16. Each filter element 18 within CFA 16 allows only one chromatic wavelength of light through. The filtered light rays 22 then strike a single color sensor 24. Preferably, the single color sensor 24 is a charge coupled device ("CCD"). Each sensor element 28 of CCD 24 generates a signal which is indicative of the intensity of the light impinging upon a CCD element. These signals are transferred through sense circuitry 32 to a memory 34 in which the color component arrays are stored. An interpolation processor 36 executing a program implementing the method of the present invention is used to generate interpolated intensity values for array elements in a color component array for which a sensor element 28 in sensor 24 did not sense a color component intensity. The interpolated values may then be stored in memory 34 or alternatively, the color component arrays with the interpolated and actual intensity values may be stored in memory 38 for further processing and use.

Figure 2:
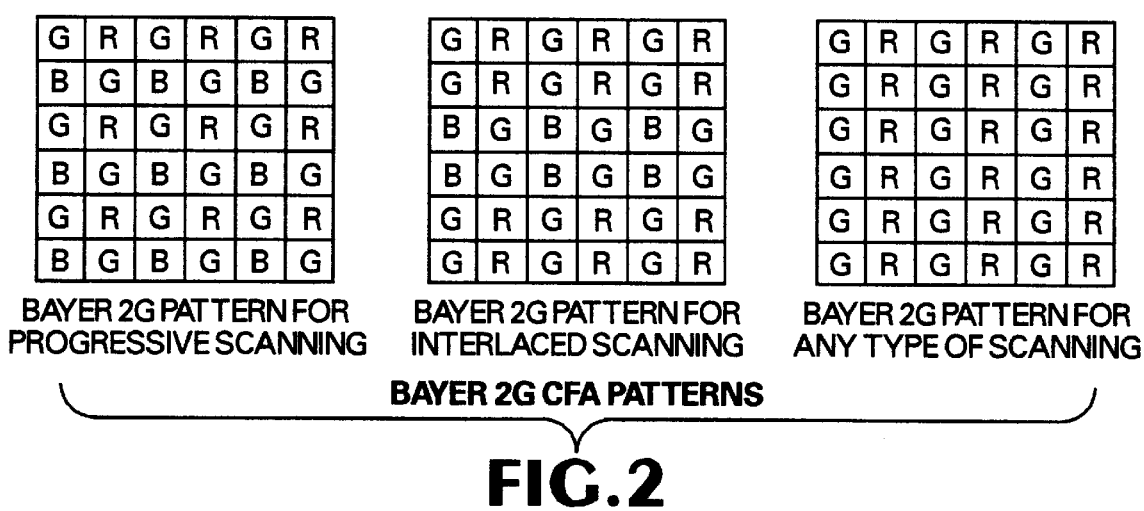
FIG. 2 is a depiction of illustrative 2G rectangular arrangements of filter elements in the color filter array of FIG. 1.

The filter elements 18 of CFA 16 may be arranged in a number of known ways such as the Bayer 2G (G-R-B ratio of 2:1:1) patterns shown in FIG. 2 or the 3G (G-R-B ratio of 3:1:1) pattern shown in FIG. 3. These patterns are well known arrangements for rectangular CFAs. In one aspect of the present invention, filter elements 18 of CFA 16 may be arranged in a triangular pattern such as those shown in FIGS. 4(a)–(c). The filter element patterns of FIGS. 4a, 4b, and 4c have the ratios (1:1:1), (4:1:1), and (2:1:1), respectively. These triangular arrangements are previously unknown arrangements of the filter elements for a CFA which are thought to further enhance the interpolation of intensity values for color component array elements determined in accordance with the method of the present invention.

Figure 5:
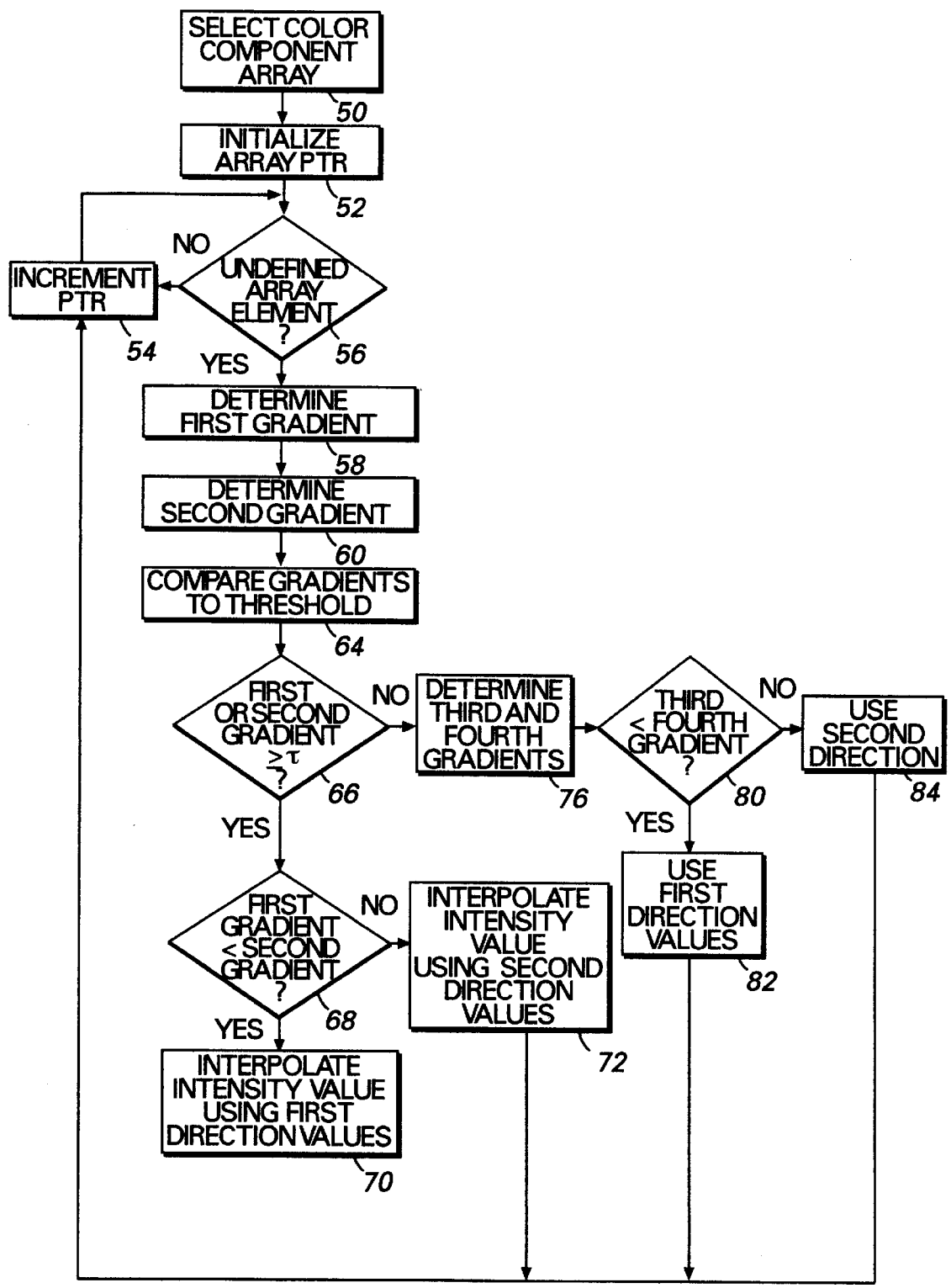
FIG. 5 is a flowchart of the preferred method for interpolating color intensity values from intensity values of a first and second color component array.

The method implemented by the interpolation processor of the present invention is shown in FIG. 5. That method begins by selecting a color component array which contains intensity values for a first color component (Block 50) and initializing the pointer to corner coordinates for one corner of the array (Block 52). The column coordinate of the pointer is incremented to look for an undefined array element not having an intensity value for the first color component (Block 56). For such an element, the absolute value of the difference between the preceding intensity value for the first color component and the next intensity value in the row of the undefined element is computed to determine a first gradient for the undefined array element (Block 58). A second color component gradient is then determined (Block 60) as the absolute value of the difference between the closest color component intensity values located above and below the location of the undefined array element. The two gradients define a first and second interpolation direction. These two gradients are then compared to a threshold $\tau$ (Block 64).

Preferably, the threshold is set at a number so that gradients below the threshold indicate a relatively minor change between intensity values in the first or second interpolation direction. If either gradient is equal to or greater than the predetermined threshold (Block 66), the first gradient is compared to the second gradient. If the first gradient is less than the second gradient (Block 68), the intensity values used to generate the first gradient and the corresponding intensity values in a second color component array which corresponds to the color sensed at the undefined array element are used to interpolate the intensity value for the undefined array element (Block 70). Otherwise, the array elements for the color component array being processed and the intensity values for the array elements of the color component sensed at the undefined array element are used to generate the interpolated value (Block 72).

For example, if the green color component array is being processed, the intensity values for the array elements in the same row, which are closest to the undefined array element, are used to generate the first gradient. Likewise, the intensities for the green color component which are above and below the undefined array element are used to generate the second gradient. If either gradient is equal to or greater than the predetermined threshold, the first gradient is compared to the second gradient. If the first gradient is smaller, then the intensity values for the green color component in the row with the undefined array element and the corresponding intensity values in the color component array actually sensed at the undefined array element are used to interpolate the value for the undefined array element. If the undefined array element actually sensed blue color intensity, the interpolated green value is:

$$G = \frac{G_{preceding} + G_{following}}{2} + \sigma \frac{2B_0 - B_{-2} - B_2}{2}$$

where $G_{preceeding}$ is the green intensity value which precedes the undefined element in the selected interpolation direction, $G_{following}$ is the green intensity value which follows the undefined element in the selected interpolation direction, $B_o$ is the blue intensity value at the undefined array element, $B_{-2}$ is the preceding blue intensity value in the selected interpolation direction and $B_2$ is the following blue intensity value in the selected interpolation direction.

With further reference to FIG. 5, if both first and second gradients are less than the predetermined threshold, a third and fourth gradient corresponding to the color component actually sensed at the undefined array element are computed (Block 76). Using the preceding and following intensity values in the second color component array for the color actually sensed at the undefined array element, a third gradient is determined. Likewise, using the intensity values for the second color component which are above and below the undefined array element, the fourth gradient is determined. Preferably, the third and fourth gradients are determined as:

$$|B_0-B_{-2}|+|B_0-B_2|$$

where $B_0$ is the intensity value for the second color component, $B_{-2}$ is the preceding intensity value in either the row or column of the undefined element and $B_2$ is the following element in either the row or column of the undefined element $B_0$. If the third gradient is less than the fourth gradient (Block 80), then the intensity values for the first color component being interpolated and the second color component actually sensed at the undefined array element are used to generate the interpolated value (Block 82). Otherwise, the vertical array elements of both the first color component being interpolated and the second color component actually sensed at the undefined array element are used for interpolation (Block 84). The process continues until all of the undefined array elements in the color component array have been processed.

The method shown in FIG. 5 may be used to interpolate intensity values for color components in which the color filter elements in CFA 16 are provided in a one-to-one ratio. Typically, CFA 16 uses an arrangement in which one color occurs more frequently than the other color components. In that case, the method of FIG. 5 is preferably applied to the color component array of the high frequency color component first. Following the interpolation of the undefined array elements for the high frequency color component, the process shown in FIG. 5 is performed to interpolate intensity values for the undefined array elements of the remaining color component arrays.

In interpolating the values for an undefined array element for the other color component arrays, the undefined array element generally lies along a first and a second diagonal of array elements which are generally orthogonal to one another. Such an arrangement is shown in FIG. 6a. If the high frequency color component is green, for example, the corresponding intensity values in the green color component array are those shown in FIG. 6b. To interpolate a value for the undefined array element R(2,3) in a chroma array (Blocks 100–108), the absolute value of the difference between the intensity values along the two red color component diagonals are computed to determine first and second gradients. These gradients are, respectively:

$$\Delta XR=|R(1,2)-R(3,4)|$$

and $$\Delta YR=|R(1,4)-R(3,2)|.$$

Similarly, the third and fourth gradients are computed from the high frequency color component according to:

$$\Delta XG=|G(2,3)-G(1,2)|+|G(2,3)-G(3,4)|$$

and $$\Delta YG=|G(2,3)-G(1,4)|+|G(2,3)-G(3,2)|$$

The first and second gradients are compared to a predetermined threshold, such as that discussed above, and if either one is greater than the threshold, the two gradients are compared to one another. The intensity values for the array elements corresponding to the smallest gradient for both the chroma color component being interpolated and the high frequency color component are used to generate the interpolated value for the undefined array element. If both gradients are less than the predetermined threshold, the gradients for the high frequency color component are compared to one another. The intensity values from the chroma and high frequency color component arrays which correspond to the smallest gradient are then used to interpolate the value for the undefined array element. An intensity value for an undefined chroma element is:

$$XR(2,3) = \frac{R(1,2) + R(3,4)}{2} + \sigma \frac{2G(2,3) - G(1,2) - R(3,4)}{2}$$

if the $\Delta XR$ diagonal direction is selected and $$YR(2,3) = \frac{R(1,4) + R(3,2)}{2} + \sigma \frac{2G(2,3) - G(1,4) - R(3,2)}{2}$$

if the $\Delta YR$ diagonal direction is selected.

While the present invention has been illustrated by a description of preferred and alternative embodiments and processes, and while the preferred and alternative embodiments processes have been described in considerable detail, it is not the intention of the applicants to restrict or in any way limit the scope of the appended claims to such detail. Additional advantages and modifications will readily appear to those skilled in the art.

What is claimed is:

1. A method for interpolating intensity values for array elements of a first color component for which intensity values for a second color component were sensed comprising the steps of:

using intensity values for a first color component to determine a first and second gradient for an array element sensing a second color component;

comparing said first and second gradients to a predetermined threshold;

selecting an interpolation direction in correspondence to said comparison between said first and said second gradients to said predetermined threshold; and interpolating a first color component intensity value for using said array element using said first color component intensity values for one of said gradients and using second color component intensity values which correspond to said selected interpolation direction.

2. The method of claim 1 further comprising the steps of:

using intensity values for said second color component to determine third and fourth gradients for said array element; and selecting said interpolation direction in accordance to said third and fourth gradients in response to said first and second gradients being less than said predetermined threshold.

3. The method of claim 1 wherein said interpolating step interpolates said first color component intensity as a sum of an average of said first color component intensities corresponding to said selected interpolation direction and a scaled average of said second color component intensity values corresponding to said selected interpolation direction.

4. The method of claim 2 wherein said selected interpolation direction corresponds to a lesser of said first and second gradients.

5. The method of claim 1 wherein said first and second gradients correspond to a horizontal and vertical interpolation direction.

6. The method of claim 1 where in said first and second gradients correspond to diagonal gradients being approximately orthogonal to one another.

7. A system for interpolating intensity values for array elements of a first color component for which intensity values for a second color component were sensed comprising:

storage for incomplete color component arrays; and an interpolation processor for selecting an interpolation direction in accordance with gradients determined for an undefined array element and for generating an interpolated value from intensity values in a first incomplete array for a first color component sampled at a first frequency and a second incomplete array for a second color component sampled at a second frequency which is lower than said first frequency, said interpolated value corresponding to said selected interpolation direction.

8. The system of claim 7 further comprising:

an intensity sensor having a plurality of sensor elements;

sense circuitry for transmitting signals from said intensity sensor to said storage to generate said incomplete arrays; and a color filter array having a plurality of filter elements in a triangular arrangement.

9. The system of claim 8 wherein said triangular arrangement of filter elements is for three color components in a 1:1:1 ratio.

10. The system of claim 8 wherein said triangular arrangement of filter elements is for three color components in a 4:1:1 ratio.

11. The system of claim 8 wherein said triangular arrangement of filter elements is for three color components in a 2:1:1 ratio.

12. A method of interpolating color component intensity values for array elements sensed by an image sensor in which only one color value is sensed at each sensor location, comprising the steps of:

selecting a first sensed color component of an array of sensed color component values that does not contain a color value for a second color component which is sampled at a higher frequency than said first sensed color component of the array, said first sensed color component;

determining gradients with respect to the first sensed color component using color component intensity values in the vicinity of the first sensed color component;

comparing the gradients to a threshold;

selecting an interpolation direction based on said step of comparing; and interpolating a second color component for the location of the first sensed color component, based on the interpolation direction, using second color components in the vicinity of the first sensed color component and using first sensed color components in the vicinity of said first sensed color component.

13. The method of claim 12 wherein said steps of determining gradients and selecting an interpolation direction comprises:

- determining a first and a second gradient using second color components in the vicinity of the first sensed color component;
- determining a third and fourth gradient using first sensed color components in the vicinity of said first sensed color component if a comparison of the first and second gradient to the threshold does not satisfy a certain condition;
- selecting the interpolation direction to correspond to the direction of the first or second gradient if the first or second gradient satisfies said certain condition when compared to the threshold; and
- selecting the interpolation direction to correspond to the direction of the third or fourth gradient if comparison of the first or second gradient to the threshold does not satisfy the certain condition.

* * * * *